United States Patent [19]

Gottwald

[11] 3,798,467

[45] Mar. 19, 1974

[54] CIRCUIT FOR INTERFERENCE FREE RECOGNITION OF ZERO CROSSINGS OF READ SIGNALS OF MAGNETIC LAYER MEMORIES

[75] Inventor: Winfried Gottwald, Martinsried, Germany

[73] Assignee: Siemens Aktiengesellschaft, Berlin & Munich, Germany

[22] Filed: Aug. 31, 1972

[21] Appl. No.: 285,553

[30] Foreign Application Priority Data

Sept. 17, 1971 Germany ............................ 2146631

[52] U.S. Cl. .................. 307/235, 307/237, 307/246, 307/293, 330/30 D

[51] Int. Cl. ............................................. H03k 5/20

[58] Field of Search ........... 307/235, 237, 246, 293; 330/30 D

[56] References Cited

UNITED STATES PATENTS

| | | | |
|---|---|---|---|
| 3,348,065 | 10/1967 | Schmidt | 307/235 X |
| 3,482,170 | 12/1969 | Ankniades et al. | 307/235 X |
| 3,505,537 | 4/1970 | Giurdano | 307/235 |
| 3,571,626 | 3/1971 | Reif | 307/246 X |

*Primary Examiner*—John S. Heyman
*Attorney, Agent, or Firm*—Hill, Sherman, Meroni, Gross & Simpson

[57] ABSTRACT

A circuit for interference free recognition of zero crossings of differentiated read signals comprises a zero detector and a signal checking circuit for simultaneously receiving the read signals. The signal checking circuit comprises an amplitude evaluation circuit and a time evaluation circuit. The zero detector and the signal checking circuit are connected to an output circuit which provides an output pulse in response to an output signal from the zero detector and the signal checking circuit. The time evaluation circuit comprises a charging circuit including a capacitor which is charged in accordance with a first time constant when a differentiated read signal exceeds an amplitude evaluation level of the amplitude evaluation circuit and is discharged in accordance with a second time constant when the differentiated read signal is lower than the amplitude evaluation threshold.

1 Claim, 4 Drawing Figures

CIRCUIT FOR INTERFERENCE FREE RECOGNITION OF ZERO CROSSINGS OF READ SIGNALS OF MAGNETIC LAYER MEMORIES

DESCRIPTION

This invention relates to a circuit for interference free recognition of the zero crossings of differentiated read signals of magnetic layer memories, wherein the differentiated signals are applied simultaneously to a zero detector and to a signal checking circuit comprising an amplitude evaluation circuit and a time evaluation circuit, an operable to emit a signal only when the differentiated read signal exceeds a given threshold for a given period of time, and wherein the output signals of the zero detector and the signal checking circuit are applied to an output circuit which emits a pulse within the output signal duration of the zero detector and when an output signal from the signal checking circuit is provided.

The peak values of the read signals must be detected during the evaluation of read signals of magnetic layer memories. For this purpose, the read signals are differentiated, so that the peak values become zero crossings. These zero crossings are recognized through the utilization of a zero detector. The read signals are superposed with interference signals which cause a time shifting of the zero crossings of the differentiated read signals. Such time shifts of the zero crossings, of course, will also cause a time shifting of the increasing or decreasing edges of the output signal of the zero detector. In a worst case application, the interference signal can influence the read signal in such a way that the differentiated read signal has zero crossings which are not at all present in the interference read signal.

In order to prevent an output signal of the circuit which evaluates the read signal in the aforementioned case, it has been suggested to arrange a signal examination circuit in parallel with the zero detector. This signal examination circuit comprises a series connection of an amplitude evaluation circuit and a time evaluation circuit. The amplitude evaluation circuit has a certain given threshold voltage at which it will respond. This threshold voltage is hereinafter called the amplitude evaluation threshold. The differentiated read signal is first of all applied to the amplitude evaluation circuit. The amplitude evaluation circuit will emit a signal as long as the differentiated read signal exceeds the amplitude evaluation threshold. The output signal of the amplitude evaluation circuit is applied to the time evaluation circuit. The time evaluation circuit determines whether the duration of the output signal exceeds a certain given time. If this is the case, the time evaluation circuit will emit an output signal which is offered to an output circuit. The output circuit is also supplied with the output signals of the zero detector. The output circuit only responds when an output signal from the time evaluation circuit is already provided when an output signal from the zero detector occurs. Due to the examination of the differentiated read signal, zero passages of the differentiated read signal produced by interference signals which would otherwise produce a signal indicating the presence of a read signal is therefore prevented.

Furthermore, it is now possible that the interfered read signal have such a path after the differentiating process that it is lower than the amplitude evaluation threshold of the amplitude evaluation circuit, for a short time, and the amplitude evaluation circuit therefore emits erroneous output signals. It is furthermore possible that an interference signal occurs alone at the amplitude of the differentiated interference signal and exceeds the amplitude evaluation threshold for a short time. In this case, the amplitude evaluation circuit will also emit an erroneous signal. It is therefore highly desirable to prevent the emission of erroneous output signals, such as those just discussed.

In view of the foregoing, it is the object of the invention to design a time evaluation circuit which is not influenced by the erroneous output signals of the amplitude evaluation circuit which can be produced by the interference signals.

The above object is achieved through the provision of a time evaluation circuit including a charging circuit comprising a capacitor which is charged in accordance with a given time constant when the differentiated read signal exceeds the amplitude evaluation threshold of the amplitude evaluation circuit, and is discharged in accordance with a second given time constant when a differentiated read signal exceeds the amplitude evaluation threshold of the amplitude evaluation circuit, and the provision of a threshold circuit which is connected with the charging circuit and produces a signal when the voltage on the capacitor becomes greater than the threshold voltage, hereinafter called the time evaluation threshold, of the threshold circuit.

Due to the output signals of the amplitude evaluation circuit, the capacitor of the charging circuit in the time evaluation circuit is charged, and then discharged after a signal disappears. If the differentiated read signal has a magnitude that is less than the amplitude evaluation threshold for a short time, due to superposed interference signals, the capacitor will be discharged by the time evaluation circuit, but only to such a degree to which the capacitor is charged by the duration of the following output signal of the amplitude evaluation circuit which still belongs to this differentiated read signal. And the foregoing is provided in such a way that the voltage on the capacitor exceeds the time evaluation threshold and the signal checking circuit will therefore emit an output signal. Such interference signals are therefore eliminated with the aid of the signal checking circuit. Corresponding functions are also true when only a short interference signal occurs. While it is true that the capacitor of the time evaluation circuit will charge, the voltage on the capacitor does not reach the time evaluation threshold. The signal checking circuit, therefore, does not emit an output signal.

Other objects, features and advantages of the invention, its organization, construction and operation will be best understood from the following detailed description of a preferred embodiment thereof taken in conjunction with the accompanying drawings, on which:

Figure 1:
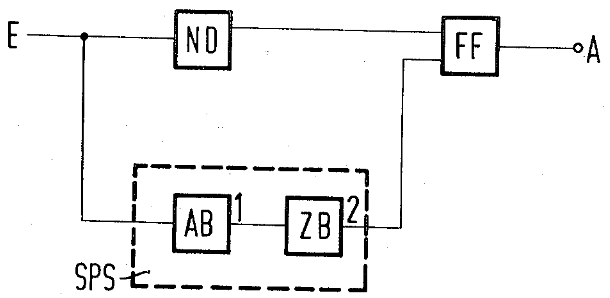
FIG. 1 is a block circuit diagram of the zero crossing recognition circuit according to the present invention.

A circuit for aiding in evaluating the read signals of magnetic layer memories, and embodying the present invention, is illustrated in FIG. 1. The circuit comprises a zero crossing detector ND, a signal checking circuit SPS and an output circuit FF having an output terminal A. The signal checking circuit SPS comprises an amplitude evaluation circuit AB and a time evaluation circuit ZB. The differentiated read signals of a magnetic layer memory are supplied to the circuit arrangement at the input E, and a signal will be emitted at the output A of the circuit when a read signal has occurred. The zero detector ND may comprise an amplitude discriminator circuit which is constructed in a well known manner. The same holds true for the amplitude evaluation circuit AB for which a prior art threshold circuit can be employed. The output circuit FF may be realized by a bistable flip-flop circuit which is prepared by the output signal of the signal checking circuit SPS and released by the output of the zero crossing detector ND.

Figure 2:
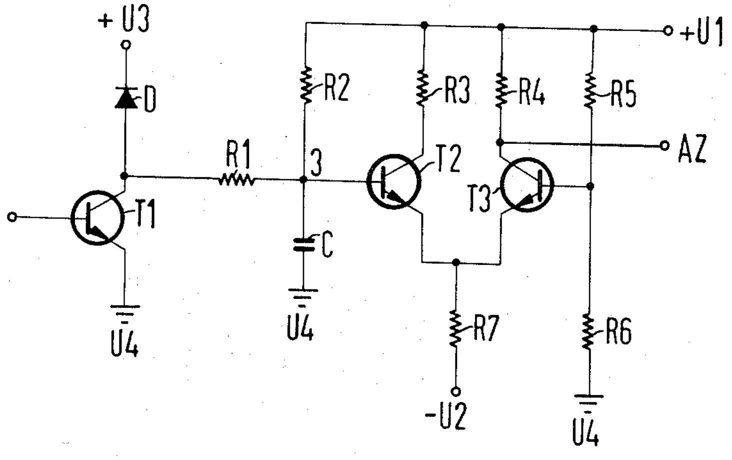
FIG. 2 is a schematic circuit diagram of a time evaluation circuit which may be employed in the circuit of FIG. 1.

The time evaluation circuit is schematically illustrated in FIG. 2. It comprises a charging circuit including a transistor T1, a diode D, a resistor R1, a second resistor R2 and a capacitor C. The emitter of the transistor T1 is connected to an operational voltage U4. The diode D is connected between the collector of the transistor T1 and a further operational voltage U3. The capacitor C has one terminal connected with the operational voltage U4 and another terminal connected to the collector of the transistor T1 by way of the resistor R1 and to another operational voltage U1 by way of the resistor R2. The threshold circuit of the time evaluation circuit ZB comprises a differential amplifier including a transistor T2, a transistor T3, a joint emitter resistor R7 and a pair of respective collector resistors R3 and R4. The base of the transistor T3 is connected to a fixed potential which is determined by a voltage divider constructed of a pair of resistors R5 and R6. Due to this fixed potential at the base of the transistor T3, the threshold voltage of the threshold circuit is determined. This threshold voltage will hereinafter be termed the time evaluation threshold. As mentioned above, the resistor R7 is a joint emitter resistor, and connects the emitters of the transistors T2 and T3 to the further operational voltage U2.

The negated output signal of the amplitude evaluation circuit AB is applied to the base of the transistor T1 of the charging circuit. As long as the amplitude evaluation circuit AB is not supplied with an input signal which exceeds the amplitude evaluation threshold, the transistor T1 will be rendered conductive, and the capacitor C will be discharged. If the amplitude evaluation circuit AB receives a signal which exceeds the amplitude evaluation threshold, the transistor T1 will be blocked and the capacitor C will charge by way of the resistor R2 until the point 3 reaches a certain potential. Then, the diode D will become conductive and a current can flow from the operational voltage U3 through the diode D and the resistor R1 to the capacitor C. Therefore, the potential at the point 3 will be limited with the aid of the diode D so that it can not assume excessive values. If the voltage on the capacitor C is greater than the time evaluation threshold determined by the voltage divider (the resistors R5 and R6), the transistor T2 of the threshold evaluation circuit will be rendered conductive and the transistor T3 of the threshold evaluation circuit will be blocked so that a voltage change will occur at the output AZ of the threshold circuit. This voltage change indicates that the differentiated signal supplied to the signal checking circuit has exceeded the amplitude evaluation threshold for the given time. This is the characteristic feature for the effect that the signal supplied to the input E in FIG. 1 may be further processed as a read signal. If the signal at the input of the amplitude evaluation circuit AB exceeds the amplitude evaluation threshold, the transistor T1 will again become conductive and the capacitor C will discharge by way of the resistor R1 and the collector-emitter path of the transistor T1. The discharge time constant is determined by the resistor R1 and the capacitor C. It may be changed, of course, by changing the value of the resistor R1. If the potential at the point 3 becomes smaller than the time evaluation threshold, the transistor T2 will be blocked and the transistor T3 will become conductive so that the initial state is attained.

Figure 3:
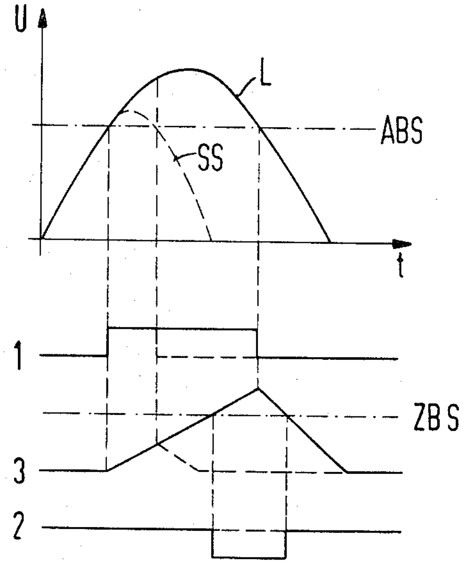
FIGS. 3 and 4 are voltage wave forms in FIGS. 1 and 2 as an aid in understanding the present invention.

The functioning of the time evaluation circuit when interference signals are applied will be explained with the help of FIGS. 3 and 4. In FIG. 3, the differentiated read signal is referenced L and is illustrated as a function of time t. The amplitude evaluation threshold is referenced ABS. The voltage curve 1 at the output of the amplitude evaluation circuit AB is illustrated as referenced in FIG. 1. Likewise the curve 2 is the voltage curve at the output of the time evaluation circuit ZB, as referenced in FIG. 1 and the reference numeral 3 corresponds to the voltage on the capacitor C of the charging circuit as referenced in FIG. 2. The time evaluation threshold is referenced ZBS. When an interference free read signal is applied, thus when the voltage curve corresponds to that indicated at L, then the voltage curve at the output of the amplitude evaluation circuit is as illustrated in the curve 1. The corresponding voltages at points 2 and 3 are also illustrated. If a short time interference signal SS alone occurs, then the voltage conditions at points 1, 2 and 3 are as illustrated in the broken line portions of FIG. 3. The voltage above the capacitor C, therefore, does not reach the time evaluation threshold ZBS and no signal will be emitted at the output AZ of the time evaluation circuit ZB.

Figure 4:
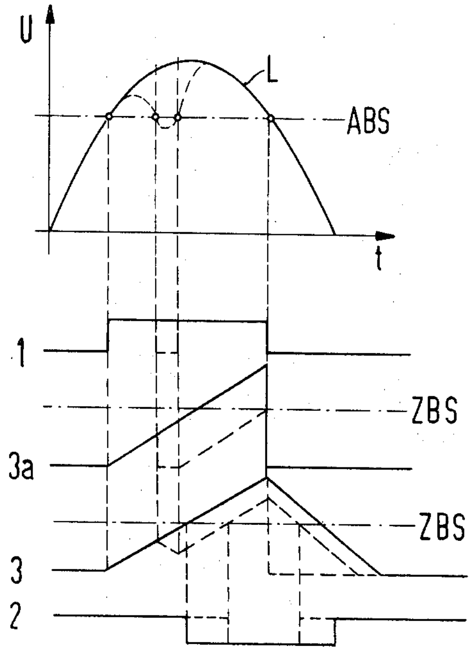

FIG. 4 illustrates conditions when a differentiated interfered read signal is received which is lower than the amplitude evaluation threshold ABS for a short time (see broken curve). In FIG. 4, the voltage curves are again referenced to corresponding points in the circuits of FIGS. 1 and 2. The voltage curve at point 3 therefore clearly shows how the capacitor C discharges when the differentiated interfered read signal is below the amplitude evaluation threshold ABS, particularly with the time constant which is based on the resistor R1 and the capacitor C, and how the capacitor recharges subsequently, when the differentiated interfered read signal again exceeds the amplitude evaluation threshold ABS. As illustrated by the broken line curve (point 3), the voltage will still reach the time evaluation threshold ZBS on the capacitor so that the threshold circuit of the time evaluation circuit will still be switched.

The curve 3a illustrates the case when the capacitor C of the charging circuit is instantaneously discharged, and not in accordance with a certain time constant. In this case, the capacitor will charge during an interfered read signal until the differentiated read signal exceeds the amplitude evaluation threshold ABS and is then instantaneously reset. If the interference illustrated in FIG. 4 occurs with such a design of the charging circuit, the capacitor C will instantaneously be reset due to the differentiated interfered read signal, when the amplitude evaluation threshold ABS is not reached, and only after the amplitude evaluation threshold ABS has been reached by the differentiated interfered read signal, will the capacitor start to charge again. The voltage of the capacitor C, however, does not reach the time evaluation threshold ZBS any more in this case, so that the time evaluation circuit does not emit a signal with such a design of the charging circuit in spite of the presence of a read signal. The read signal will therefore not be recognized as such. This undesired result is avoided by the circuit arrangement according to FIG. 2 in such a way that the capacitor discharges with a fixed time constant.

Although I have described my invention by reference to a particular preferred embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit for interference free recognition of zero crossings of differentiated read signals of magnetic layer memories, comprising: a zero crossing detector for receiving read signals and operable to emit an output pulse in response thereto; a signal checking circuit for receiving read signals simultaneously with said zero crossing detector, said signal checking circuit including an amplitude evaluation circuit having an amplitude evaluation threshold and a time evaluation circuit having a time evaluation threshold and operable to emit an output signal; and an output circuit operable to emit an output pulse in response to receipt of an output signal from said zero crossing detector and an output signal from said signal checking circuit, said time evaluation circuit comprising a charging circuit including a capacitor, means for charging said capacitor in accordance with a first time constant when a differentiated read signal exceeds the amplitude evaluation threshold of said amplitude evaluation circuit, means for discharging said capacitor in accordance with a second time constant when the differentiated read signal is lower than the amplitude evaluation threshold, and a threshold evaluation circuit connected to said charging circuit and operable to emit an output signal when the voltage on said capacitor becomes greater than its given threshold value, said charging circuit comprising said capacitor which has a first terminal connected to a first supply potential and a second terminal connected to said threshold evaluation circuit, said means for charging said capacitor comprises a first resistor connected between said second terminal and a second supply potential, said means for discharging said capacitor comprises a transistor having a base, an emitter and a collector, said emitter connected to the first supply potential, a diode connected between said collector and a third supply potential to limit the potential at said second terminal of said capacitor, a second resistor connected between said collector and said second terminal of said capacitor, said transistor being blocked in response to the application of a differentiated read signal to said base which exceeds the amplitude evaluation threshold.

* * * * *